(12) United States Patent
Sitzmann et al.

(10) Patent No.: US 9,996,775 B2
(45) Date of Patent: Jun. 12, 2018

(54) METHOD FOR CONFIGURING A VARNISHING UNIT IN A DIGITAL PRINTING MACHINE

(71) Applicant: HEIDELBERGER DRUCKMASCHINEN AG, Heidelberg (DE)

(72) Inventors: Bernd Sitzmann, Sandhausen (DE); Rolf Kuendgen, Bad Schoenborn (DE); Patrick Roth, Kandel (DE); Rainer Hofmann, Hirschhorn (DE); Michael Postels, Dossenheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 3 days.

(21) Appl. No.: 15/137,130

(22) Filed: Apr. 25, 2016

(65) Prior Publication Data
US 2016/0314384 A1 Oct. 27, 2016

(30) Foreign Application Priority Data
Apr. 24, 2015 (DE) .......................... 10 2015 207 554

(51) Int. Cl.
*G06F 3/12* (2006.01)
*G06K 15/02* (2006.01)

(52) U.S. Cl.
CPC ....... *G06K 15/1868* (2013.01); *G06F 3/1204* (2013.01); *G06F 3/1208* (2013.01); *G06F 3/1256* (2013.01); *G06F 3/1264* (2013.01); *G06F 3/1282* (2013.01); *G06F 3/1254* (2013.01)

(58) Field of Classification Search
None
See application file for complete search history.

(56) References Cited

U.S. PATENT DOCUMENTS

| 5,327,826 A * | 7/1994 | Rodi ....................... B41F 13/12 101/181 |
| 5,521,674 A | 5/1996 | Guillory et al. |
| 6,351,263 B1 * | 2/2002 | Naoi ..................... G06K 15/005 345/589 |
| 6,873,435 B1 * | 3/2005 | Tehranchi .......... H04N 1/32128 358/1.9 |
| 2002/0140953 A1 * | 10/2002 | Furukawa ............ G02B 26/125 358/1.7 |

(Continued)

FOREIGN PATENT DOCUMENTS

| DE | 102013209908 A1 | 12/2013 |
| DE | 102014208896 A1 | 11/2015 |
| JP | 2003-255773 * | 9/2003 ............. G03G 21/00 |

*Primary Examiner* — Beniyam Menberu
(74) *Attorney, Agent, or Firm* — Laurence A. Greenberg; Werner H. Stemer; Ralph E. Locher

(57) ABSTRACT

A method for configuring the further processing of printing substrates in a digital printing machine includes modifying settings for configuring the further processing while the machine is in operation. The settings of the further processing are created by using a configuration program running on a control unit of the digital printing machine. The modified settings have an effect on at least one region to be further processed on the printing substrate and the settings are printed onto the printing substrate so as to be allocated to a corresponding region to be further processed.

10 Claims, 3 Drawing Sheets

(56) References Cited

U.S. PATENT DOCUMENTS

| | | | |
|---|---|---|---|
| 2004/0141195 A1* | 7/2004 | Sasanuma | H04N 1/4078 |
| | | | 358/1.9 |
| 2005/0030563 A1* | 2/2005 | Matsunami | H04N 1/6011 |
| | | | 358/1.9 |
| 2006/0152776 A1* | 7/2006 | Bailey | H04N 1/6055 |
| | | | 358/504 |
| 2007/0070407 A1* | 3/2007 | Katou | H04N 1/00132 |
| | | | 358/1.15 |
| 2007/0186793 A1* | 8/2007 | Schreiber | B41F 33/00 |
| | | | 101/211 |
| 2010/0092201 A1 | 4/2010 | Kielland | |
| 2010/0326305 A1* | 12/2010 | Craswell | B41M 7/02 |
| | | | 101/492 |
| 2011/0063634 A1* | 3/2011 | Boness | B41F 33/0081 |
| | | | 358/1.9 |
| 2011/0310140 A1* | 12/2011 | Tonohiro | B41J 11/0015 |
| | | | 347/6 |
| 2012/0086956 A1* | 4/2012 | Hirao | G06K 15/1852 |
| | | | 358/1.2 |
| 2012/0182374 A1* | 7/2012 | Matsuda | G06F 3/1208 |
| | | | 347/225 |
| 2012/0218574 A1* | 8/2012 | Fukuda | H04N 1/6097 |
| | | | 358/1.9 |
| 2012/0237247 A1* | 9/2012 | Tokushima | G03G 15/6585 |
| | | | 399/82 |
| 2013/0235403 A1* | 9/2013 | Takara | H04N 1/00334 |
| | | | 358/1.13 |
| 2013/0265609 A1* | 10/2013 | Kawabe | H04N 1/6033 |
| | | | 358/3.01 |
| 2014/0146102 A1 | 5/2014 | Mizes et al. | |
| 2015/0336400 A1* | 11/2015 | Swei | C09D 11/12 |
| | | | 347/102 |
| 2016/0077482 A1* | 3/2016 | Takamizawa | G03G 15/6585 |
| | | | 399/341 |

* cited by examiner

METHOD FOR CONFIGURING A VARNISHING UNIT IN A DIGITAL PRINTING MACHINE

CROSS-REFERENCE TO RELATED APPLICATION

This application claims the priority, under 35 U.S.C. § 119, of German Patent Application DE 10 2015 207 554.0, filed Apr. 24, 2015; the prior application is herewith incorporated by reference in its entirety.

BACKGROUND OF THE INVENTION

Field of the Invention

The present invention relates to a method for configuring the further processing of printed sheets in a digital printing machine in which settings for configuring the further processing are modified by using a configuration program while the machine is in operation. The configuration program runs on the control unit of the digital printing machine. It creates the settings for at least one region to be further processed on the printed sheet and positions them next to the region where they are printed by the digital printing machine.

The technical field of the invention is the field of finishing printed sheets.

The use of different types of printing substrates is common in the printing industry. In addition to the standard process of printing on printing paper, the use of other printing substrates such as glass, plastics, metals, wood, and the like have become known. Even printing paper comes in various shapes, from thin newsprint to firm drawing paper, from varnished paper to cardboard and other types of board. For the printing process itself, a distinction needs to be made between pre-treated printing substrates, including printing on such a pre-treated printing substrate, and the post-treatment of a substrate that has already been printed. In web-fed printing machines, the post-treatment of the printed substrate is mostly implemented by further processing units integrated into the printing machine. In sheet-fed printing machines, both an integration of the further processing devices into the printing machine and a further processing of the printed sheets in an external further processing machine are conceivable. The use of a further processing machine integrated into the printing machine allows the printed substrates to be further processed in an automated way. The further processing machines may be co-configured from the start by the control unit when the printing machine is configured.

In accordance with the prior art, the configuration of the further processing unit, for instance a varnishing unit, so far needs to be done manually by the operator of the machine. The configuration operations include adjusting the pressure between the varnish metering roller and the plate cylinder and adjusting the pressure between the plate cylinder and the printing substrate. In addition, the varnish image is adapted to the printed image to be finished by varying the circumferential, lateral, and diagonal registers. In that process, the settings are gradually modified on the control console of the printing machine and are then forwarded to the varnishing unit through the control unit of the printing machine. Frequently, a copy is produced with a set of settings to allocate the settings to the varnish image. That process is repeated until the desired result is obtained. However, that is an extremely time-consuming and costly process because for every set of parameters for the varnishing unit, a copy needs to be printed and evaluated by the operator.

In order to solve those problems, the two main approaches of the prior art need to be examined. On one hand, the operator may individually try and subsequently evaluate every set of settings. However, that involves an enormous amount of time and money. On the other hand, multiple sets of setting parameters may be varied while the machine is in operation. A problem with that approach, however, is to allocate the individual copies to the relevant sets of setting parameters that have been tried.

The second approach in particular seems suited as a starting point for solving the aforementioned problems of the prior art. Thus it is conceivable to successively test many sets of set-up parameters in an automated way by using the control unit of the printing machine. Once all sets of set-up parameters have been processed, the operator may decide which set best meets the requirements. That approach saves even more time compared to the prior art. In order to additionally reduce costs by reducing the consumption of printing material, a number of regions with different sets of varnishing unit set-up parameters may be positioned on one print sheet. However, a serious problem with that approach is that if that process is carried out efficiently, i.e. if there are many different sets of set-up parameters on one print sheet, it is even harder for the operator to allocate the individual regions that have been further processed to the applied set-up parameters. That prevents a fast and efficient evaluation of the different set-up parameters that have been tried. One approach to solve the problem might be to mark the different sets of set-up parameters in a suitable way.

SUMMARY OF THE INVENTION

It is accordingly an object of the invention to provide a method for configuring a varnishing unit in a digital printing machine, which overcomes the hereinafore-mentioned disadvantages of the heretofore-known methods of this general type and which implements further processing of printed printing substrates with different settings in an automated way in which the different settings are marked in a corresponding way on the printing substrate.

With the foregoing and other objects in view there is provided, in accordance with the invention, a method for configuring the further processing of printing substrates in a digital printing press in which settings for configuring the further processing are modified while the machine is in operation. The method is distinguished in that the settings for the further processing are created by a configuration program running on a control unit of the digital printing machine, that the modified settings have an effect on at least one area of the region to be further processed on the printing substrate, and that the settings are printed onto the printing substrate in association with the corresponding region to be further processed.

This means that a configuration program is provided that implements different settings for the further processing. In this process, a number of test contents that are adapted to or are identical with the printed image to be applied are applied to one or more test print sheets by a digital printing machine. The method may also be applied to webs of printing material in web-fed printing machines. For reasons of simplicity, however, the present document will continue to refer to print sheets. For every one of the test images, which may be identical or different, a set of further processing settings is tried. The further processing thus occurs within the printing process, i.e. while the machine is in operation. The configuration program then transmits the test sheets including the different test images to the digital printing machine, which applies the test images. In the course of the further processing, the test sheet that has been printed is transported to the further processing unit where every test image is subjected to further processing. In this process, the configuration program uses the different settings and the information on which settings are to be used to process which test images/test regions, to configure the further processing unit. In order to make it easier for the operator to allocate the settings to the respective test region having a result which is to be evaluated, the digital printing machine prints the settings that are to be used by the further processing unit for the test region in question next to the test image. This allows the operator to examine the result of the applied settings without difficulty and to simultaneously understand the allocation of the result to the implemented settings.

In accordance with another preferred mode of the method of the invention, the varying settings are compiled by the operator with the aid of the configuration program.

Based on their experience, operators may choose any desired settings for the further processing in the configuration program. They decide on the number of settings to be tried and configure them. In this process, they may select complete sets of settings from a database, which they may modify, or they may create entirely new sets of settings. Another option is to save the used or newly created sets of settings in a database.

In accordance with a further preferred mode of the method of the invention, in this context, the varying settings are compiled by the set-up program in the form of an unvarying calibration program.

Another option for the implementation of the configuration program is that it is not a configuration program that is configurable by the operator but a fixed, unvarying calibration program. In this context, an advantage is that the same sets of settings are used again and again and that every test run produces the same results irrespective of the operator's experience.

In accordance with an added preferred mode of the method of the invention, in this context, the settings are printed onto empty areas of the sheet that are free to be used.

The settings printed by the digital printing machine need to be applied to the print sheet in the immediate vicinity of the respective region that is further processed in order to allow an unequivocal allocation. In this context, the positioning needs to be made in such a way that any mistaken allocation to an adjacent region that has been further processed is impossible. In general, empty areas without text or images on the sheet may be used for this purpose. Such empty areas may easily be provided on the sheet in the course of the implementation of the method of the invention because it is the configuration program itself that positions the test content on the test sheet.

In accordance with an additional preferred mode of the method of the invention, in this context, the further processing of the sheet is implemented in the form of an application of varnish by using a varnishing unit and the settings refer to setting up the varnishing unit. A very common type of further processing of a printed sheet is the application of a varnish onto a printed surface in a flexographic varnishing unit provided downstream of the actual printing machine.

In accordance with yet another preferred mode of the method of the invention, in this context, the settings include process parameters such as the name of the varnish, the batch number of the varnish, the screen roller number, and target values for register settings and dryer settings for the varnishing unit.

These setting parameters are typical parameters for configuring a varnishing unit and are accordingly applied by the digital printing machine next to the printed region to be varnished.

In accordance with yet a further preferred mode of the method of the invention, in this context, the settings are applied next to the region to be further processed in such a way that they are visually recognizable.

In order to allow an operator to allocate the settings to the corresponding region to be further processed, they clearly need to be applied next to the region in such a way as to be legible. The legibility may refer to being legible to humans, in a suitable font and language, or machine-readable.

In accordance with yet an added preferred mode of the method of the invention, in this context, the settings are applied to be machine-readable, in particular in the form of a QR or bar code, and are evaluated in an automated way.

If the settings are applied to be machine-readable, for instance in the form of a QR or bar code, an automated evaluation is possible. In this context, the result of the further processing would for instance be scanned by an optical sensor, rated by a program with an image processing algorithm, and the settings provided by the adjacent machine-readable code would be used if they have the corresponding rating.

In accordance with a concomitant preferred mode of the method of the invention, in this context, the printed image is simplified in the register-relevant regions compared to the actual printed image to simplify the visualization of the further processing. Since the focus of the method of the invention is not the printing of a print image but above all the further processing/finishing of the printed region, a simplified printed image may be used for the varnish register in the relevant regions. This provides a simpler comparison between the effects of the further processing based on the applied settings.

Other features which are considered as characteristic for the invention are set forth in the appended claims.

Although the invention is illustrated and described herein as embodied in a method for configuring a varnishing unit in a digital printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
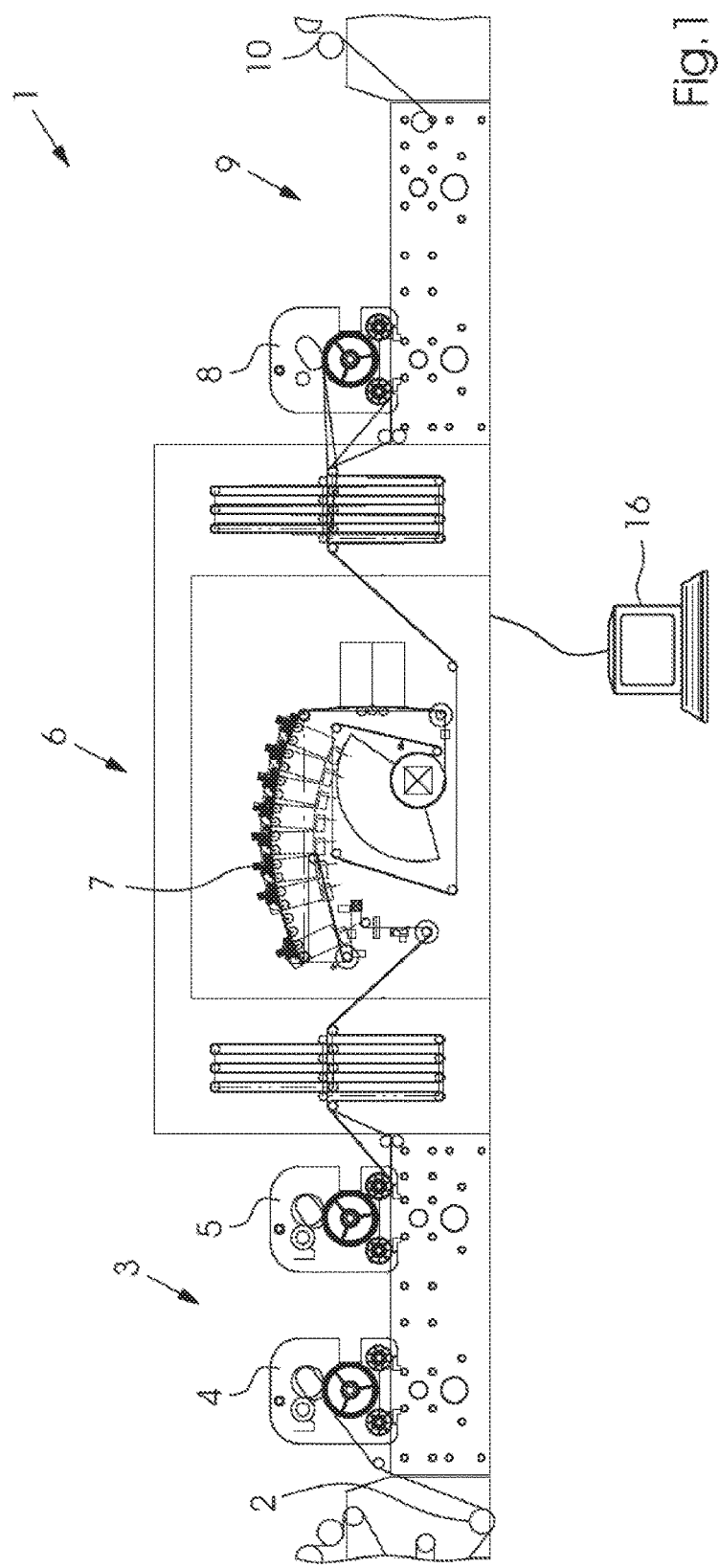
FIG. 1 is a diagrammatic, longitudinal-sectional view of an inkjet printing machine with a control unit.

Referring now in detail to the figures of the drawings, in which mutually corresponding elements bear the same reference numerals, and first, particularly, to FIG. 1 thereof, there is seen a preferred exemplary embodiment in which an inkjet printing machine 1 having an integrated varnishing unit 8 is used. FIG. 1 illustrates an example of such a digital inkjet printing machine 1 with a print preparation stage 3 having an unwinding device 2 for a web, a flexographic unit 4 for a white/solid area and a flexographic unit 5 for a primer. The web is then fed to an inkjet printing unit 6 having an inkjet print head 7. Finally, the web travels to a further processing stage 9 having an integrated flexographic varnishing unit 8 and a wind-up unit 10 for the web. The printing machine is a web-fed printing machine, but the method of the invention is suitable for both web-fed and sheet-fed printing machines.

Figure 3:
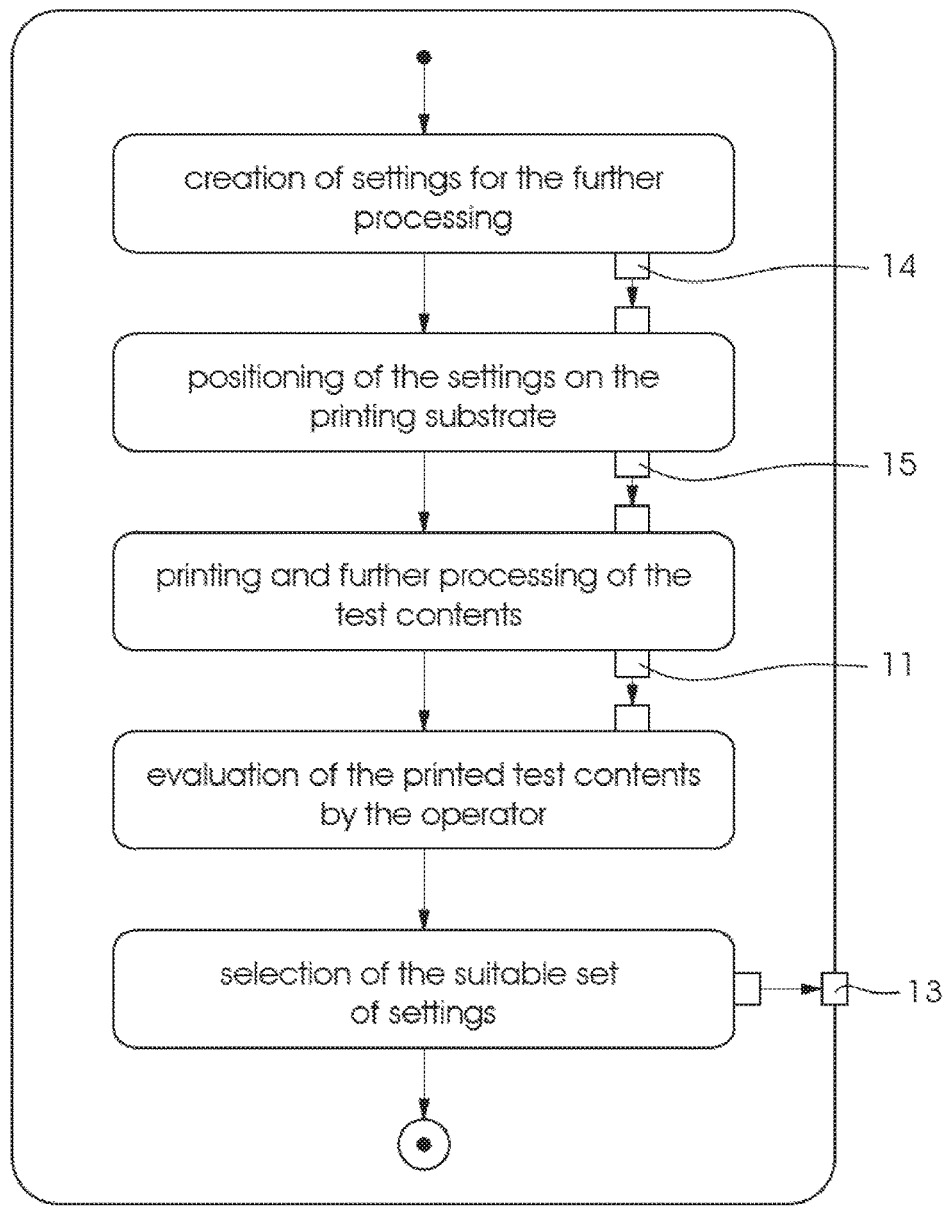
FIG. 3 is a flow chart of the method of the invention.

FIG. 3 is a flow chart of the method of the invention. A configuration program controlling the printing of the test contents by the inkjet printing machine 1 and the further processing of the test content regions by the flexographic varnishing unit 8 runs on a control unit or controller 16 of the printing machine. The first step of the method of the invention is the provision of settings 14 for the further processing. For this purpose, the operator selects from the database of the configuration program the further processing settings for the varnishing unit 8 that seem to be most appropriate for the current print job. If there are not yet enough different sets of settings for the flexographic varnishing unit 8 available in the database, the operator may create a new set of settings in the configuration program 14. The configuration program then allocates corresponding test content 12 to every desired set of settings 14. Every test content 12 forms a region 12 that is further processed in the course of the test run on the varnishing unit 8. Then the configuration program positions all of the selected test contents 12 and their further processing settings 14 on a printing substrate 11, i.e. the sheet or web of printing material.

Figure 2:
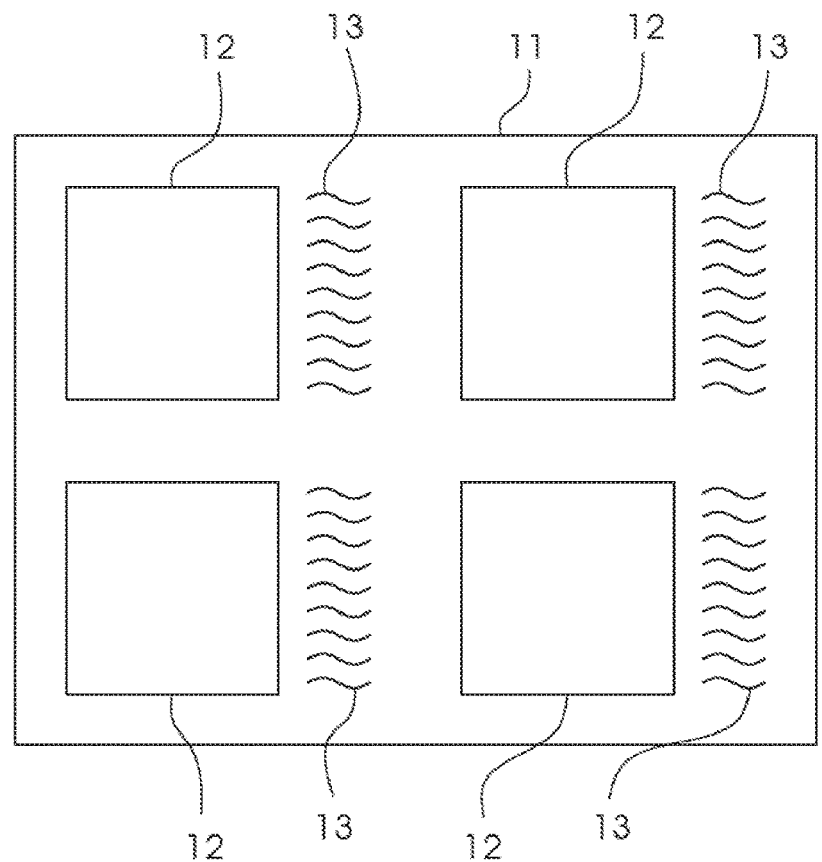
FIG. 2 is a plan view of a printing substrate illustrating an example of an allocation between a varnish region and settings printed next to the varnish region.

An example of such test content 12 is shown in FIG. 2. The settings, which are legible to the human eye, are positioned directly and unequivocally next to the test region 12 to be varnished. Once position information 15 of the regions to be subjected to further processing and of the settings of the test contents 12 is completed, the test contents 12 are printed onto the printing substrate 11 by the digital printing machine 1. Subsequently they are passed through the flexographic varnishing unit 8, where varnish is applied to the corresponding test regions 12 in accordance with the settings 14 that the configuration program has communicated to the varnishing unit 8 through the control unit 16. In the next step, an operator inspects the printed and further processed test contents 12 and selects the varnished region 12 that is closest to the requirements and selects settings 13 for the further processing. The further processing settings 14 to be tested which are positioned next to the region 12 will then be used to configure the flexographic varnishing unit 8 for the actual print job. If the settings have been created by the operator and were not previously available in the database of the configuration program, the operator may additionally save them in the database to make them available for further print and varnishing jobs.

The invention claimed is:

1. A method for configuring a further processing of printed printing substrates in a further processing unit of a digital printing machine, the method comprising the following steps:
   creating different settings to configure the further processing of the printed printing substrates by the further processing unit while the machine is in operation by using a configuration program running on a control unit of the digital printing machine;
   printing test contents in different test regions on the printing substrate by using the digital printing machine controlled by the configuration program, while also printing the different settings on the printing substrate so as to be allocated to correspond to the test regions with the test contents on the printing substrate;
   assigning a single setting to every test region with the test contents to configure the further processing of a printed printing substrate by the further processing unit;
   printing the different settings in empty regions on the printing substrate being free to be used; and
   using the different settings to affect the test regions with the test contents of the printed printing substrate to be further processed by the further processing unit by applying the assigned setting for further processing for every test region.

2. The method according to claim 1, which further comprises using an operator to compile the different settings by using the configuration program.

3. The method according to claim 1, which further comprises using the configuration program formed as an unvarying calibration program to compile the different settings.

4. The method according to claim 1, which further comprises implementing the further processing of the printing substrate as an application of varnish by a varnishing unit wherein the settings refer to a configuration of the varnishing unit.

5. The method according to claim 4, wherein the different settings include process parameters.

6. The method according to claim 5, wherein the process parameters are selected from the group consisting of a name of the varnish, a batch number of the varnish, a screen roller number, target register settings and target dryer settings for the varnishing unit.

7. The method according to claim 1, which further comprises visibly applying the different settings next to the at least one region to be further processed.

8. The method according to claim 7, which further comprises applying the different settings in such a way as to be machine-readable and evaluated in an automated way.

9. The method according to claim 7, which further comprises applying the different settings as a QR or bar code.

10. The method according to claim 1, which further comprises simplifying the printed image in register-relevant areas to simplify a visualization of the further processing in comparison with an actual printed image.

* * * * *